May 29, 1934.  H. B. MARVIN  1,961,007
VIBRATION VELOCITY MEASURING DEVICE
Filed March 18, 1933    2 Sheets-Sheet 1
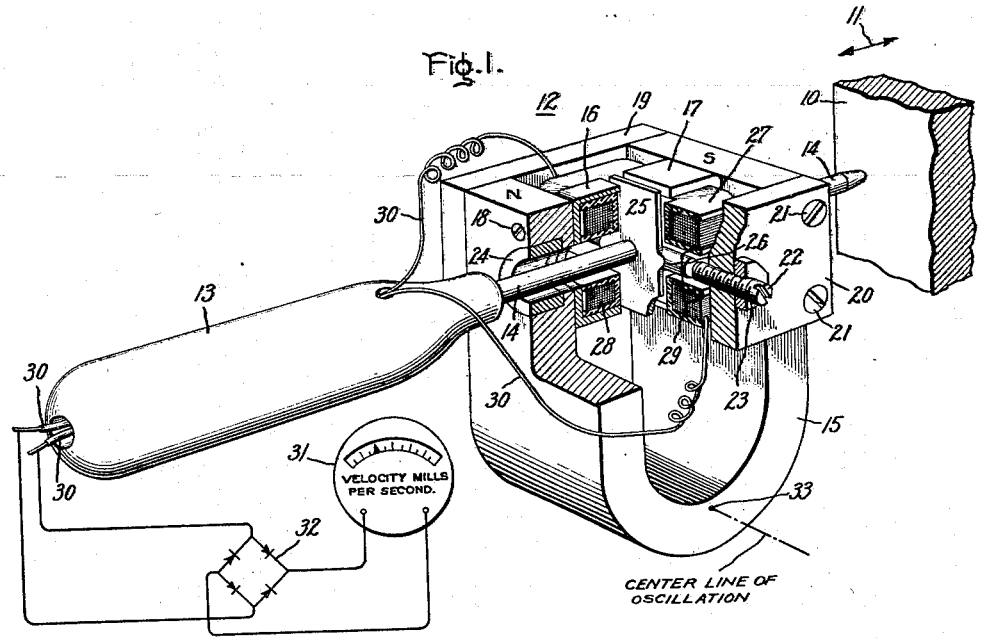
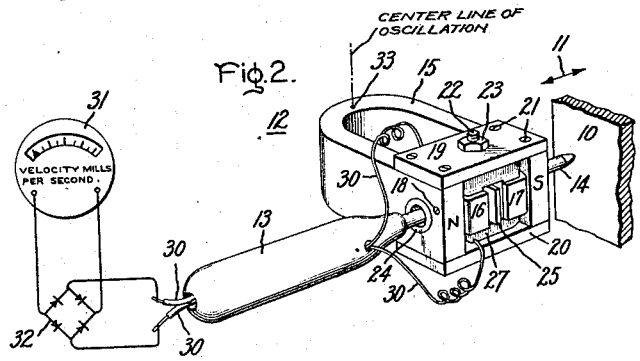
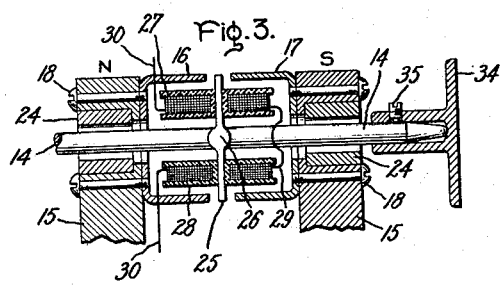
Inventor:
Harry B. Marvin,
by *Charles E. Mullan*
His Attorney.

May 29, 1934.    H. B. MARVIN    1,961,007
VIBRATION VELOCITY MEASURING DEVICE
Filed March 18, 1933    2 Sheets-Sheet 2
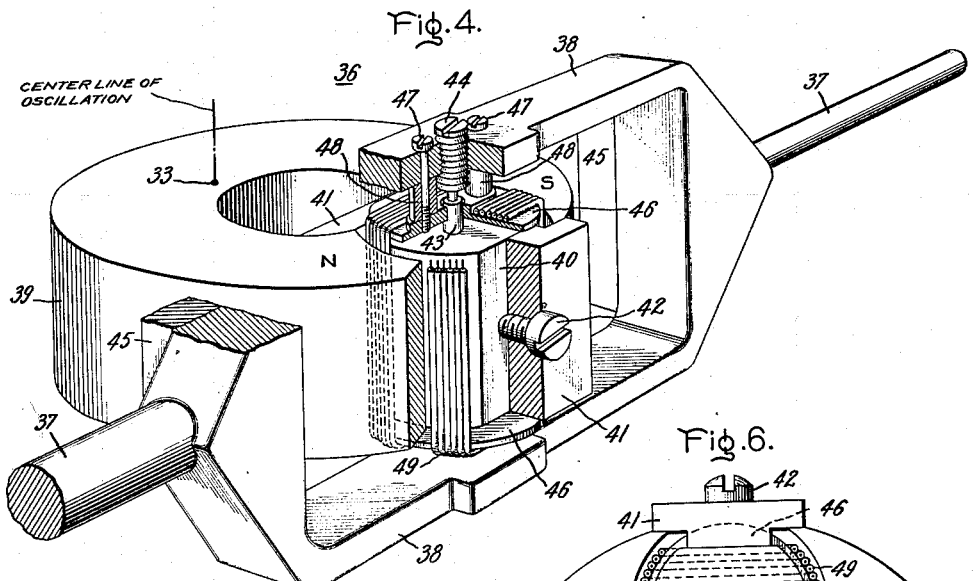
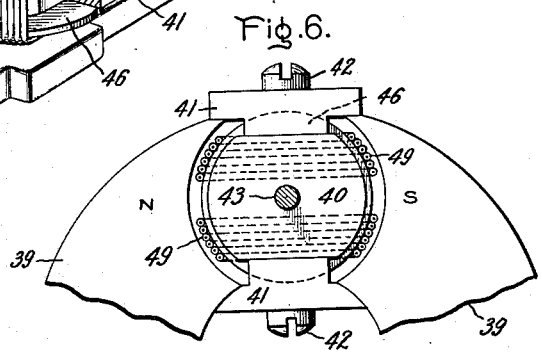
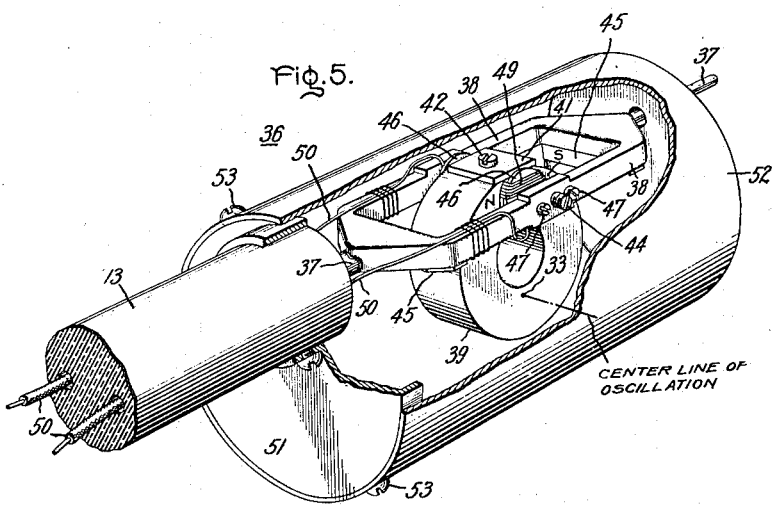
Inventor:
Harry B. Marvin
by Charles E. Tullar
His Attorney.

Patented May 29, 1934

1,961,007

UNITED STATES PATENT OFFICE 1,961,007

VIBRATION VELOCITY MEASURING DEVICE

Harry B. Marvin, Schenectady, N. Y., assignor to General Electric Company, a corporation of New York Application March 18, 1933, Serial No. 661,524

15 Claims. (Cl. 177—351)

My invention relates to energy translating devices and more specifically to devices for transforming mechanical vibrations into an electrical voltage. The principal object of my invention is to provide a device of this character which, in combination with a suitable electrical measuring instrument, will be capable of measuring the vibration velocity of a vibrating body.

The steadily growing interest in the reduction of noise levels in machinery, factories, offices, and homes is causing engineers and scientists to devote a great deal of study to noise problems and noise suppression. The amplitude at which a given object vibrates depends largely upon its physical characteristics, whereas the frequency of its vibration depends largely upon its physical characteristics and upon the fundamental frequency of the driving source, and, therefore, the determination of the amplitude and frequency are usually of interest only to the designer. The velocity at which an object vibrates, however, is of prime interest in a consideration of noise measurement or noise suppression. The reason for this is that the noise produced by a vibrating object is a measure of the vibration energy it expends, and the vibration energy it expends is more often proportional to velocity of vibration than it is either to amplitude or frequency of vibration, because the vibration energy is substantially directly proportional to the square of the velocity. It therefore became desirable to provide a device that would measure the velocity at which a body vibrates in the noise producing frequency range.

My invention provides a device which is capable of measuring the velocity at which a body vibrates both in the noise producing frequency range and outside of this range. Briefly described, a preferred form of my invention consists of a rod having one end thereof adapted to make contact with the vibrating body so as to have oscillatory translational motion in substantial synchronism with that part of the vibrating body it is pressed against, a magnet pivotally suspended from the rod so that the plane of its motion is substantially parallel to the translational motion of the rod, the magnet having confronting pole faces of opposite magnetic polarities separated by an air gap and having its mass so distributed that its center of oscillation is a predetermined distance from its pivotal axis, an armature of magnetic material occupying a portion of the magnet's air gap, and a coil surrounding the armature, the armature being so secured to the rod that oscillation of the magnet about its pivotal axis causes a magnetic flux of varying magnitude to thread the coil.

During translational motion of the rod, that part of the magnet adjacent to its axis of suspension also has translational motion, but due to its inertia, the magnet at the same time tends to oscillate as if it were suspended from its center of oscillation. The combination of these two motions causes the magnet to oscillate about its pivotal axis, hence generating an alternating voltage in the coil. This voltage is substantially directly proportional to the velocity of the translational motion of the rod, and is impressed on a suitable electrical measuring instrument having a scale calibrated in velocity units of the translational motion of the rod. The instrument thus gives a direct reading of the velocity of vibration of the vibrating body.

My invention, however, will be best understood from the following description when considered in connection with the accompanying drawings, while those features of my invention which are believed to be novel and patentable are pointed out in the appended claims.

Figs. 1 and 2 of the drawings represent perspective views of a preferred form of my device, the two figures showing different ways of holding the device in contact with a vibrating body to measure the vibration velocity thereof, these figures also showing the device electrically connected to a suitable electrical measuring instrument; Fig. 3 represents a side elevational view of a portion of this device showing a slightly different arrangement of the coil in which the voltage is generated, and a different end on the rod to be placed in contact with the vibrating body; Figs. 4 and 5 represent perspective views of another embodiment of my device, these two figures also showing different ways of holding the device in contact with a vibrating body to measure the vibration velocity thereof; and Fig. 6 represents a side elevational view of a portion of this device showing the relationship between the magnet, the magnetic core secured thereto, and the coil which is positioned in the air gap between the magnet and its core. Similar parts in the various figures are represented by the same reference characters.

Either form of my invention can measure the vibration velocity of any vibrating body, and can measure this velocity in any one plane at a time. For the sake of illustration I have represented in Fig. 1 a portion of a vibrating body by reference numeral 10, this body portion vibrating in the plane represented by the double headed 110 arrow 11. The device for transforming the mechanical vibrations into an electrical voltage is represented generally by 12. This device consists of a light weight handle 13 secured in any suitable manner to one end of a light weight metallic rod 14 whose other end is adapted to make contact with some part of vibrating body 10. The free end of rod 14 is pressed against vibrating body 10 so that the plane in which the latter vibrates, as represented by double headed arrow 11, is parallel to the axis of the rod, hence the rod will have oscillatory translational motion in substantial synchronism with that part of the vibrating body it is pressed against. A U-shaped magnet is represented by 15, and, preferably, it is a permanent magnet made out of cobalt steel. This magnet has confronting poles N and S, as shown. Two C-shaped magnetic pole pieces 16 and 17 are secured by screws 18 to as nearly as practical the polar ends of the magnet so that they have confronting parallel pole faces separated by an air gap (see also Fig. 3). A portion of magnet 15 and a portion of pole piece 16 are shown broken away in order to present a clearer view of the remaining parts. It is clear that the top and bottom projections of pole piece 16 will be of N polarity, whereas the top and bottom projections of pole piece 17 will be of S polarity.

Two non-magnetic bearing blocks 19 and 20 are secured by screws 21 to the magnet on opposite sides thereof and as nearly practical to its polar ends. A portion of block 20 is shown broken away in order to present a clearer view of the remaining parts. Threaded into each bearing block at or about its center is a screw 22 having a slotted head so that it may be readily adjusted into and out of the block, the screw being held in its adjusted position by a lock nut 23. Only screw 22 threaded into bearing block 20 is shown in Fig. 1, but it will be understood that a similar screw is similarly threaded into bearing block 19 (see Fig. 2), and that those ends of these screws which are opposite to their slotted heads face each other. Rod 14 passes through holes in magnet 15 and pole pieces 16 and 17. Only one of the holes in the magnet and the hole in pole piece 16 can be seen in Fig. 1, but both sets of holes can be seen in Fig. 3. In each hole of the magnet there is preferably placed an annular piece of elastic material 24, as for example sponge rubber. This elastic material has a hole slightly larger than the diameter of rod 14 and is shellaced or glued to the magnet, or held in this position in any suitable manner. Secured to rod 14 in any suitable manner is a magnetic armature 25 so that it is in the air gap between the confronting parallel faces of pole pieces 16 and 17. The thickness of armature 25 is less than the air gap between pole pieces 16 and 17, whereas its length and width are approximately the same as those of the pole pieces. In Fig. 1, one corner of armature 25 is shown broken away in order to expose a portion of the lower projection of pole piece 17. Armature 25 has two laterally projecting arms 26, only one of which is shown, but it will be understood that the other arm 26 extends away from the armature in the direction opposite to that of the arm 26 which is shown. The ends of arms 26 are pivoted in the inwardly extending ends of screws 22 without any appreciable lost motion. It is clear that magnet 15 and all parts secured thereto are pivotally suspended from the two arms 26 and, therefore, from rod 14. Any suitable anti-friction bearing arrangement may be employed so that magnet 15 and the parts secured thereto can freely oscillate about the two arms 26. Many such arrangements are known and I therefore believe it unnecessary to illustrate one in detail. One such arrangement may, for example, consist of having the ends of arms 26 hardened and ground to the shape of a cone, these hardened ends resting in jewel bearings embedded in the inwardly extending ends of screws 22. By properly adjusting these screws the magnet with the parts secured thereto will be very freely suspended from rod 14.

Two coils 27 and 28 surround armature 25 on opposite sides of the axis of suspension of magnet 15. These coils are shown partly broken away in order to give a clear view of armature 25. Each coil is positioned so that it lies partly in the recess of pole piece 16 and partly in the recess of pole piece 17 with its plane substantially perpendicular to the confronting parallel faces of these pole pieces. These coils may be secured by any suitable means to magnet 15 or pole pieces 16 and 17, or they may be made to fit very snugly into the recesses of the pole pieces so as to form a unitary structure with the magnet and the pole pieces without employing fastening means. It is clear that magnet 15, pole pieces 16 and 17, and coils 27 and 28 form a unitary structure freely suspended from rod 14. Coils 27 and 28 may be connected in any desired manner to the output circuit, and for the sake of illustration I have shown them connected in series by a lead 29. The free ends of the coils are connected to leads 30 which are, for convenience, carried through a hole in handle 13. These leads may be connected to any suitable type of measuring instrument. For the sake of illustration, I have shown these leads connected to a direct current indicating instrument 31 having a scale calibrated in velocity mills per second. A suitable full wave rectifier 32 is connected in series with instrument 31.

Screws 22 are positioned in bearing blocks 19 and 20 so that armature 25 is substantially centrally disposed in the air gap between pole pieces 16 and 17. When magnet 15 is hanging in a vertical position and rod 14 is horizontal the armature 25 will be substantially parallel to the confronting faces of pole pieces 16 and 17. The shape of magnet 15 and the distribution of its mass are such that the center of oscillation of the pendulously mounted unitary structure comprising the magnet, pole pieces 16 and 17, and coils 27 and 28, is a predetermined distance from the axis of suspension of this structure. For the sake of illustration, I will assume that the center of oscillation of this structure is represented by a line passing through point 33, this line being parallel to the axis of suspension of the structure. I have also labeled the line passing through point 33 "center line of oscillation" to make this clear in the drawings.

I will first describe why a voltage is generated in each of coils 27 and 28 when magnet 15 is oscillated about its axis of suspension and then I will describe the operation of the entire device. When magnet 15 is hanging vertically and rod 14 is horizontal the air gaps between the upper end of armature 25 and the upper faces of pole pieces 16 and 17 are substantially equal, and the same is true of the air gaps between the lower end of the armature and the lower faces of the pole pieces. The flux from the upper projection of pole piece 16 will therefore pass straight across to the upper projection of pole piece 17, and the flux from the lower projection of pole piece 16 will pass straight across to the lower projection of pole piece 17, hence substantially no flux will pass up or down through armature 25. If, now, magnet 15 is turned in a clockwise direction, the width of the air gap between the upper end of armature 25 and the upper projection of pole piece 16 will be decreased from its former value and the same will be true of the air gap between the lower end of the armature and the lower projection of pole piece 17. This will provide a path of lower reluctance between these projections than was the case with equal air gaps, and a flux will pass from the upper projection of pole piece 16 down through armature 25 and into the lower projection of pole piece 17. The magnitude of this flux will depend on the amount that magnet 15 has been turned from its vertical position. If, however, magnet 15 is turned in a counter-clockwise direction from its vertical position, the width of the air gap between the upper end of armature 25 and the upper projection of pole piece 17 will be decreased from its former value and the same will be true of the air gap between the lower end of the armature and the lower projection of pole piece 16. This will provide a path of lower reluctance between these projections than was the case with equal air gaps, and a flux will pass from the lower projection of pole piece 16 up through armature 25 and into the top projection of pole piece 17. The magnitude of this flux will also depend on the amount that magnet 15 has been turned from its vertical position. It should now be clear that by oscillating magnet 15 about arms 26 an alternating flux of varying magnitude will pass through armature 25, and this will generate an alternating voltage in each of coils 27 and 28 since these coils are inductively threaded by the flux passing up or down through the armature. By suitably connecting the coils in series the voltage between leads 30 will be the sum of the separate coil voltages.

A description of the operation of the device now follows. Assume that body 10 is vibrating in the plane, represented by double headed arrow 11. By means of handle 13 the free end of rod 14 is pressed against vibrating body 10 with sufficient force so that the rod is always in contact with the vibrating body, and so that the plane in which the latter vibrates is parallel to the axis of the rod. This force will ordinarily be slightly greater than the weight of device 12. It is clear that rod 14 and armature 25 will have oscillatory translational motion in synchronism with that part of the vibrating body the rod is pressed against. During this translational motion that part of the magnet near its axis of suspension also has translational motion, but, due to its inertia, the magnet at the same time tends to oscillate as if it were suspended from its center of oscillation 33, since this center of oscillation tends to remain fixed in space even though rod 14 is vibrating. If there were no frictional forces in the bearings on which magnet 15 is suspended the center of oscillation 33 would remain fixed in space when rod 14 vibrates. By reducing these frictional forces to negligible quantities the center of oscillation 33 practically remains fixed in space when rod 14 vibrates. The combination of the translational motion of that part of magnet 15 near its axis of suspension and its rotational motion about center of oscillation 33 causes the magnet to oscillate about its axis of suspension. This, for reasons previously described, generates an alternating voltage in each of coils 27 and 28.

The frequency at which magnet 15 oscillates about its axis of suspension is the same as the frequency at which body 10 vibrates. Except during the operating condition described below the sine of the angle through which magnet 15 oscillates about its axis of suspension is substantially directly proportional to the amplitude of vibration of member 10. This causes the effective value of the alternating voltage generated in each of coils 27 and 28 to be substantially directly proportional to the velocity of vibration of member 10. The above referred to operating condition occurs under the following circumstances: The oscillation of magnet 15 in a vertical plane about its axis of suspension causes it to act as a pendulum because of the restoring force exerted on it by gravity. It is well known that each pendulum tends to oscillate at its natural frequency, hence this is also true of magnet 15. When the frequency at which member 10 vibrates is the same or nearly the same as the natural frequency of vibration of magnet 15, then resonance takes place and the amplitude of vibration of the magnet depends on how near the two frequencies are equal and on the magnitude of the damping effect on the oscillation of the magnet produced by resilient strips 24 when they strike against rod 14. Under this condition the effective value of the alternating voltage generated in each of coils 27 and 28 is not substantially directly proportional to the velocity of vibration of member 10. This condition should therefore be avoided and it is avoided in the following manner:

I will first assume that it is desired to measure the vibration velocity of member 10 within the noise producing frequency range, that 20 cycles per second is the lowest frequency noise which is audible to the average human ear, and that member 10 will not vibrate below 15 or 20 cycles per second. The shape, weight, and distribution of the mass of magnet 15 are so selected that its center of oscillation 33 is at such a distance from its axis of suspension as to make the natural frequency of vibration of the magnet well below 20 cycles per second, as for example 5 cycles per second. The sine of the angle through which magnet 15 oscillates about its axis of suspension will then be substantially directly proportional to the amplitude of vibration of body 10 at any frequency from around 15 cycles per second and above. The effective value of the alternating voltage induced in each of coils 27 and 28 will then be substantially directly proportional to the velocity of vibration of body 10. The sum of the voltages of the two coils is impressed on instrument 31 connected in series with rectifier 32, and by suitably calibrating the scale of this instrument in velocity units of body 10, the velocity of vibration of this body may be read directly from the instrument. For the sake of illustration I have shown the instrument scale calibrated in mills per second, but, of course, any other velocity unit may be employed. By suitable construction of the pivot bearings on which magnet 15 is suspended from rod 14 so as to reduce the clearance in these bearings to a negligible amount, the device 12 will, when held as shown in Fig. 1, measure the vibration velocity of body 10 from the lowest vibration frequency within the noise producing frequency range up to any desired frequency within this range, and even beyond this range.

If rod 14 should be pressed against some body vibrating at a frequency which is the same, or nearly the same, as the natural frequency of vibration of magnet 15, the latter will, for reasons previously described, tend to vibrate at its maximum amplitude. The elastic strips 24 will, however, strike against rod 14 and sufficiently dampen the vibration of the magnet to prevent armature 25 from striking the projections of pole pieces 16 and 17, and will therefore prevent damage to the device.

Now assume that body 10 may vibrate at any frequency below the lowest assumed audible noise frequency, as for example 2 or 3 cycles per second, and that it is desired to measure the vibration velocity of the body at this low frequency. This is readily accomplished by swinging device 12 a quarter of a turn on the axis of rod 14 so that the axis of suspension of magnet 15 is vertical and the magnet is horizontal as shown in Fig. 2, and pressing rod 14 against body 10 as previously described. In this position there are practically no restoring forces on magnet 15 because the gravitational forces on the magnet are balanced, hence the magnet becomes aperiodic, i. e., its natural frequency of vibration is zero. The sine of the angle through which magnet 15 oscillates about its axis of suspension will, therefore, be substantially directly proportional to the amplitude of vibration of body 10 at all frequencies, even down to nearly zero frequency. The effective value of the alternating voltage generated in each of coils 27 and 28 will then be substantially directly proportional to the velocity of vibration of body 10 at all frequencies, even down to nearly zero frequency. It should now be clear that when device 12 is held in the manner shown in Fig. 2 it will not only measure the vibration velocity of body 10 during the noise producing frequency range, but it will also measure its vibration velocity both above and below this frequency range.

In Fig. 3, coils 27 and 28 surround armature 25 as in Fig. 1, but instead of the coils being secured in some manner to pole pieces 16 and 17 they are secured by any suitable means to the armature so as to move as a unitary structure with the armature and rod 14. However, from the description given in connection with Fig. 1 it will be clear that the operation of the device with the coils as shown in Fig. 3 will be the same as that of the device shown in Fig. 1. It is oftentimes necessary to measure the vibration velocity of a vibrating body whose physical nature is such that it is undesirable to press thereagainst the small end of rod 14, or whose expenditure of vibration energy per unit of area is so small that an insufficient amount of this energy will be transmitted to the small end of rod 14 when it is pressed against the body to obtain the most satisfactory operation of the measuring device. An example of this is when it is desired to use device 12 in a manner somewhat similar to that for which a stethoscope is used, except that instead of listening for sounds produced in the patient's chest, abdomen, etc., it is desired to measure the velocity of the vibrations which produce these sounds. The aforementioned difficulties may be overcome and satisfactory operation of the device obtained when used with vibrating bodies of this character by securing a flanged member 34 to rod 14 by a screw 35, as shown in Fig. 3, the area of the flange being considerably greater than the area of the rod end.

Although my device will measure the vibration velocity in only one plane at a time, i. e., in a plane parallel to the axis of rod 14, it is clear that the velocities in various planes can be measured one after another.

I have shown a handle 13 on device 12 in Figs. 1 and 2 because I believe that a very useful field of application for it will be as a "Go" or "No Go" measuring device. This field of application may be illustrated by assuming a production line of electric or internal combustion motors going through test, and assuming that an acceptable motor, insofar as the noise produced thereby, has been measured for its velocity of vibration in many different planes and that the maximum indication of instrument 31 during this test was 5, for example. The motors in the production line are then tested one after another for vibration velocity in different planes. This can be readily accomplshed since instrument 31 and rectifier 32 are so small that they can be held in one hand, especially when they are assembled as a unit, and the tester grasps handle 13 in the other hand, and since the entire device is light, portable, and needs no outside source of power for its operation, the tester can rapidly test each motor in many different planes. When a motor vibration produces a reading of 5 or under on instrument 31 the tester knows that the motor is satisfactory for production use, whereas when a motor vibration produces a reading of more than 5 on the instrument the tester knows that the motor is unsatisfactory for noise and he returns it to the assembly room for correction. If it is desired to use my device for giving a continuous measurement of the vibration velocity of a single vibrating body in a given plane, then this may be accomplished by permanently securing the free end of rod 14 to the vibrating body in any suitable manner. Handle 13 may then be omitted from the device.

The other form of my device is represented generally by 36 in Figs. 4 and 5. Referring to Fig. 4, this device consists of a light weight metallic rod 37 having integral therewith or secured thereto a non-magnetic light weight cradle having side members 38 parallel to the rod. One of these side members is shown partly broken away to give a clearer view of other parts, but both members are shown in Fig. 5. A circular magnet 39, preferably a permanent magnet made out of cobalt steel, has confronting circularly-shaped pole faces N and S separated by an air gap which is partly occupied by a magnetic core 40 secured to the magnet by non-magnetic T-shaped clamping members 41 and screws 42 (see also Fig. 6). The shape and dimensions of core 40 are such as to leave a narrow annular air gap between each pole face of magnet 39 and the adjacent face of core 40 (see also Fig. 6). From each side of core 40 there projects an arm 43 which is pivoted without any appreciable lost motion in the inwardly extending end of a slotted screw 44 which is threaded into one of side members 38. Only one of arms 43 and one of screws 44 is shown in Fig. 4, but it will be understood that a similar arm 43 projects from the other side of core 40 and is pivoted in a similar screw 44 threaded into the other member 38 (see Fig. 5). It should therefore be clear that magnet 39, core 40, clamping members 41 and screws 42 form a unitary structure which is pivotally suspended from side members 38 of the cradle. A suitable anti-friction bearing arrangement should be provided so that this unitary structure may freely oscillate about screws 44, the reason for this being the same as that described in connection with the device shown in Figs. 1, 2 and 3. The parts are so arranged that the axis of suspension of this unitary structure is also the center of the annular air gaps between magnet 39 and core 40. A strip of resilient material 45, such as sponge rubber, is secured to the back and front members of the cradle as shown in Figs. 4 and 5, the object of these strips being the same as that for which such strips are used in the device shown in Figs. 1, 2 and 3. By making magnet 39 circular in shape I am enabled to bring its center of oscillation represented by 33 nearer to its axis of suspension than if it were non-circular in shape. This will cause the magnet to oscillate with a greater amplitude for a given amplitude of vibration of rod 37 than if the magnet were non-circular, thus generating a higher voltage in the coil now to be described than if it were non-circular.

To each side member 38 is secured a thin circular non-magnetic disc 46 by means of two screws 47, the disc having a clearance hole through which arm 43 of core 40 passes. Two spacing bushings 48 between each side member and the adjacent disc keep the latter slightly separated from the adjacent face of core 40 and also keep it spaced the proper distance from the side member. This arrangement is completely shown only on one side of the core with a portion of the disc and one of the bushings broken away to improve the view, but it will be understood that a similar arrangement is provided on the other side. A coil 49 is wound around the two discs 46 so as to pass through the annular air gaps between magnet 39 and core 40 without touching either (see also Fig. 6). A portion of this coil is shown broken away in Fig. 4 to show a clear view of core 40 and one of its arms 43, but it will be understood that this is one complete coil. The ends of this coil are secured to leads 50 which pass through holes in handle 13 as shown in Fig. 5. Coil 49 is so wound around discs 46 that its plane is substantially parallel to the magnetic lines of force passing across the annular air gaps between magnet 39 and core 40 when the magnet is in the center of its oscillating motion, as for example, when the magnet is hanging in a vertical position and the rod is horizontal as shown in Fig. 5. This is the most advantageous position for the coil because it results in the maximum rate of change in the magnetic flux inductively threading the coil as the magnet moves to either side of the center of its oscillating motion, hence generating the maximum voltage in a given coil.

From the description given in connection with the device shown in Figs. 1, 2 and 3, it will be clear that if the end of rod 37 of the device shown in Figs. 4 and 5 is pressed against a vibrating body as shown in Figs. 1 or 2, then magnet 39 will oscillate about its axis of suspension and an alternating voltage will be generated in coil 49. When the device is held as shown in Fig. 5, then magnet 39 acts as a pendulum and it has a natural frequency of oscillation about its axis of suspension. As explained in connection with the device held as shown in Fig. 1, the natural frequency of vibration of magnet 39 in Fig. 5 can be made very low, for example 5 cycles per second. The device shown in Fig. 5 can then be used to measure the vibration velocity of a body vibrating at any frequency within the noise producing frequency range, and also when the body is vibrating at some frequency above this range. When the device is held as shown in Fig. 4, then magnet 39 is aperiodic, i. e., its natural frequency of vibration is zero. From the explanation given in connection with the device held as shown in Fig. 2, it will be clear that the device shown in Fig. 4 can be used for measuring the vibration velocity of a body vibrating at any frequency within the noise producing frequency range, and also when the body is vibrating at some frequency either above or below this range, and even down to nearly zero frequency. In each case the voltage generated in coil 49 will be substantially directly proportional to the vibration velocity of the vibrating body. Coil 49 will preferably be connected to instrument 31 in series with rectifier 32 as shown in Figs. 1 and 2, the instrument thus indicating the vibration velocity of the vibrating body against which rod 37 is pressed. If desired the end of rod 37 may be provided with a flanged plate 34 as shown in Fig. 3. It should now be clear that the device shown in Figs. 4 and 5 may also be used as a "Go" or "No Go" measuring device, or used for continuously measuring the vibration velocity of a vibrating body.

Devices 12 and 36 are both very light, hence neither device adds much weight to the vibrating body against which its rod is pressed, even when the vibrating body is fairly light, and, therefore, neither device causes an appreciable change in the amplitude at which the vibrating body vibrates. The vibrating body will therefore vibrate with substantially the same amplitude when the contact rod of either device is pressed thereagainst as it did before this was done. This is an important advantage because it enables either form of my device to measure with a high degree of accuracy the vibration velocity of fairly light vibrating bodies as well as of heavy vibrating bodies. It should be clear that either form of my device combines the advantageous features of lightness, compactness, portability, generation of the power necessary to operate the instrument, very low or zero natural frequency of vibration of the oscillating member, and high degree of accuracy in measuring the vibration velocity of fairly light as well as of heavy vibrating bodies.

In Fig. 5 I have shown a circular magnetic flange 51 eccentrically mounted on handle 13 and a cup-shaped magnetic casing 52 secured to flange 51 by screws 53. Casing 52 has a hole through which rod 37 projects, and a part of the casing is shown broken away in order to illustrate the parts enclosed thereby. It will be understood, however, that actually the casing is not broken away, but completely surrounds the working parts of the device. The object of flange 51 and casing 53 is to shield magnet 39 and coil 49 from stray magnetic fluxes. In a similar manner the same result may be obtained with the device shown in Figs. 1 and 2.

In accordance with the provisions of the patent statutes, I have described the principles of operation of my invention, together with the apparatus which I now consider to represent the best embodiments thereof, but I desire to have it understood that the apparatus shown and described is only illustrative, and that the invention may be carried out by other means.

What I claim as new and desire to secure by Letters Patent of the United States, is:

1. A device for transforming mechanical vibrations into an electrical voltage comprising a movable member having one end thereof adapted to make contact with a vibrating body so as to have oscillatory translational motion in substantial synchronism with that part of the vibrating body it is in contact with, means rigidly secured to said movable member, and other cooperating means freely suspended from said movable member with its mass so distributed that its center of oscillation is a predetermined distance from its axis of suspension whereby the freely suspended means oscillates about its axis of suspension in response to translation motion of said movable member, said first and second mentioned means being adapted to generate in response to relative movement therebetween a voltage whose magnitude varies in a predetermined relation to the velocity of the translational motion of said movable member.

2. A device for measuring the vibration velocity of a vibrating body, said device comprising a movable member having one end thereof adapted to make contact with the vibrating body so as to have oscillatory translational motion in substantial synchronism with the vibration of that part of the vibrating body it is in contact with, means rigidly secured to said movable member, and other cooperating means pivotally suspended from said movable member with its mass so distributed that its center of oscillation is a predetermined distance from its axis of suspension whereby the pivotally suspended means oscillates about its pivotal axis in response to translational motion of said movable member, said first and second mentioned means being adapted to generate in response to relative movement therebetween a voltage whose magnitude varies in a predetermined relation to the velocity of the translational motion of said movable member.

3. A device for measuring the vibration velocity of a vibrating body, said device comprising a movable member having one end thereof adapted to make contact with the vibrating body so as to have oscillatory translational motion in substantial synchronism with the vibration of that part of the vibrating body it is in contact with, means rigidly secured to said movable member, other cooperating means freely suspended from said movable member with its mass so distributed that its center of oscillation is a predetermined distance from its axis of suspension whereby the freely suspended means oscillates about its axis of suspension in response to translational motion of said movable member, said first and second mentioned means being adapted to generate in response to relative movement therebetween an alternating voltage whose effective value is substantially directly proportional to the velocity of the translational motion of said movable member, an electrical measuring instrument having a scale calibrated in velocity units of the translational motion of said movable member, and connecting means between said voltage generating means and said instrument.

4. An energy translating device comprising a movable member arranged for oscillatory translational motion, two relatively movable structures, one of said structures being rigidly secured to said movable member, and the other of said structures being freely suspended from said movable member, one of said structures comprising a magnet having confronting pole faces of opposite magnetic polarities separated by an air gap, and the other of said structures comprising an armature of magnetic material occupying a portion of said air gap, and a coil secured to one of said structures and arranged to surround said armature, said structures being so arranged that the translational motion of said movable member causes a relative motion between said magnet and said armature, and the magnet and armature being so arranged that their relative motion causes a magnetic flux of varying magnitude to thread said coil from one to the other of said pole faces.

5. A device for transforming mechanical vibrations into an electrical voltage comprising a movable member adapted to be subjected to the vibrations to be investigated and to have oscillatory translational motion in substantial synchronism with such vibrations, a magnet pivotally suspended from said movable member so that the plane of its motion is substantially parallel to the translational motion of said movable member, said magnet having an air gap as a part of its magnetic circuit and having its mass so distributed that its center of oscillation is a predetermined distance from its pivotal axis, the oscillatory translational motion of said movable member causing said magnet to oscillate as if it were suspended from its center of oscillation and thereby producing oscillation of said magnet about its pivotal axis, and means so disposed in said air gap as to be threaded by a magnetic flux of varying magnitude in response to the oscillation of said magnet about its pivotal axis, said means being adapted to generate a voltage whose magnitude varies in a predetermined relation to the velocity of the translational motion of said movable member.

6. A device for transforming mechanical vibrations into an electrical voltage comprising a movable member adapted to be subjected to the vibrations to be investigated and to have oscillatory translational motion in substantial synchronism with such vibrations, two relatively movable structures, one of said structures being secured to said movable member and the other of said structures being pivotally suspended from said movable member so that the plane of its motion is substantially parallel to the translational motion of said movable member and having its mass so distributed that its center of oscillation is a predetermined distance from its pivotal axis, one of said structures comprising a magnet having confronting pole faces of opposite magnetic polarities separated by an air gap, and the other of said structures comprising an armature of magnetic material occupying a portion of said air gap, and a coil secured to one of said structures and arranged to surround said armature, said magnet and armature being so arranged that their relative motion causes a magnetic flux of varying magnitude to thread said coil from one to the other of said pole faces.

7. A device for transforming mechanical vibrations into an electrical voltage comprising a movable member having one end thereof adapted to make contact with a vibrating body so as to have oscillatory translational motion in substantial synchronism with that part of the vibrating body it is in contact with, a magnet pivotally suspended from said movable member so that the plane of its motion is substantially parallel to the translational motion of said movable member, said magnet having confronting pole faces of opposite magnetic polarities separated by an air gap and having its mass so distributed that its center of oscillation is a predetermined distance from its pivotal axis, an armature of magnetic material occupying a portion of said air gap, and a coil surrounding said armature, said armature being so secured to said movable member that oscillation of said magnet about its pivotal axis causes a magnetic flux of varying magnitude to thread said coil from one to the other of said pole faces.

8. A device for transforming mechanical vibrations into an electrical voltage comprising a movable rod having one end thereof adapted to make contact with a vibrating body so as to have oscillatory translational motion in substantial synchronism with the vibration of that part of the vibrating body it is in contact with, a magnet pivotally suspended from said rod so that the plane of its motion is substantially parallel to the translational motion of said rod, said magnet having confronting pole faces of opposite magnetic polarities separated by an air gap and having its mass so distributed that its center of oscillation is a predetermined distance from its pivotal axis, an armature of magnetic material occupying a portion of said air gap, and a coil surrounding said armature, said armature being so secured to said rod that oscillation of said magnet about its pivotal axis causes a magnetic flux of varying magnitude to thread said coil from one to the other of said pole faces.

9. A device for transforming mechanical vibrations into an electrical voltage comprising a movable rod having one end thereof adapted to make contact with a vibrating body so as to have oscillatory translational motion in substantial synchronism with that part of the vibrating body it is in contact with, a handle secured to the other end of said rod for pressing the same against the vibrating body, a magnet pivotally suspended from said rod so that the plane of its motion is substantially parallel to the translational motion of said rod, said magnet having two confronting pole pieces of opposite magnetic polarities separated by an air gap and having its mass so distributed that its center of oscillation is a predetermined distance from its pivotal axis, said pole pieces having their adjacent faces substantially parallel to each other and each pole piece having a recess surrounding said rod, an armature of magnetic material occupying a portion of said air gap, said armature being so secured to said rod that it is substantially midway between and parallel to said adjacent pole faces when said magnet is in the center of its oscillating motion, two coils arranged to form a unitary structure with said pole pieces and to surround said armature on opposite sides of the pivotal axis of said magnet, each coil being so arranged that it lies partly in the recess of each pole piece with its axis substantially perpendicular to said adjacent pole faces, and connecting means between said coils.

10. A device for transforming mechanical vibrations into an electrical voltage comprising a movable rod having one end thereof adapted to make contact with a vibrating body so as to have oscillatory translational motion in substantial synchronism with that part of the vibrating body it is in contact with, a magnet pivotally suspended from said rod so that the plane of its motion is substantially parallel to the translational motion of said rod, said magnet having confronting pole faces of opposite magnetic polarities separated by an air gap and having its mass so distributed that its center of oscillation is a predetermined distance from its pivotal axis, an armature of magnetic material occupying a portion of said air gap, and a coil arranged to form a unitary structure with said armature and to surround the latter, said armature being so secured to said rod that oscillation of said magnet about its pivotal axis causes a magnetic flux of varying magnitude to thread the coil from one to the other of said pole faces.

11. An energy translating device comprising a movable member arranged for oscillatory translational motion, and two relatively movable structures, one of said structures being rigidly secured to said movable member and the other of said structures being freely suspended from said movable member, one of said structures comprising a magnet having an air gap as a part of its magnetic circuit, and the other of said structures comprising a coil occupying a portion of said air gap, the freely suspended structure having its mass so distributed that its center of oscillation is a predetermined distance from its axis of suspension whereby translational motion of said movable member causes a relative motion between the magnet and coil, and the magnet and coil being so arranged that their relative motion causes the latter to be threaded by a magnetic flux of varying intensity.

12. A device for transforming mechanical vibrations into an electrical voltage comprising a movable member adapted to be subjected to the vibrations to be investigated and to have oscillatory translational motion in substantial synchronism with such vibrations, two relatively movable structures, one of said structures being rigidly secured to said movable member, and the other of said structures being pivotally suspended from said movable member so that the plane of its motion is substantially parallel to the translational motion of said movable member and having its mass so distributed that its center of oscillation is a predetermined distance from its pivotal axis, one of said structures comprising a magnet having an air gap as a part of its magnetic circuit, and the other of said structures comprising a coil occupying a portion of said air gap, said magnet and coil being so arranged that their relative motion causes the coil to be inductively threaded by a magnetic flux of varying intensity, thereby generating a voltage in said coil.

13. A device for transforming mechanical vibrations into an electrical voltage comprising a movable member having one end thereof adapted to make contact with a vibrating body so as to have oscillatory translational motion in substantial synchronism with that part of the vibrating body it is in contact with, a magnet freely suspended from said movable member, said magnet having an air gap as a part of its magnetic circuit, and a coil rigidly secured to said movable member so as to occupy a portion of said air gap, said magnet being so arranged that the translational motion of said movable member causes a relative motion between the magnet and coil, and said coil being so arranged that the relative motion therebetween and the magnet causes the coil to be threaded by a magnetic flux of varying intensity, thereby generating a voltage in the coil.

14. A device for transforming mechanical vibrations into an electrical voltage comprising a movable rod having one end thereof adapted to make contact with a vibrating body so as to have oscillatory translational motion in substantial synchronism with the vibration of that part of the vibrating body it is in contact with, a magnet pivotally suspended from said rod so that the plane of its motion is substantially parallel to the translational motion of said rod, said magnet having an air gap as a part of its magnetic circuit and having its mass so distributed that its center of oscillation is a predetermined distance from its pivotal axis, and a coil occupying a portion of said air gap, said coil being so secured to said rod that oscillation of said magnet about its pivotal axis causes the coil to be inductively threaded by a magnetic flux of varying intensity, thereby generating a voltage in said coil.

15. A device for transforming mechanical vibrations into an electrical voltage comprising a movable rod having a portion thereof formed as a cradle and having one end thereof adapted to make contact with a vibrating body so as to have oscillatory translational motion in substantial synchronism with that part of the vibrating body it is pressed against, a handle secured to the other end of said rod for pressing the same against the vibrating body, a magnetic field structure comprising a magnet having two confronting circularly-shaped pole faces of opposite magnetic polarities and a magnetic core between these pole faces secured to the magnet, the shape and dimensions of said core being such as to leave two narrow circularly-shaped air gaps between the pole faces of the magnet and the adjacent faces of the core, said magnetic field structure being pivotally suspended from said cradle so that the plane of its motion is substantially parallel to the translational motion of said rod and so that its pivotal axis is the center of said circularly-shaped air gaps, the mass of said magnetic field structure being so distributed that its center of oscillation is a predetermined distance from its pivotal axis, and a coil in said circularly-shaped air gaps, said coil being so secured to said cradle that its plane is substantially parallel to the magnetic lines of force passing across said circularly-shaped air gaps when said magnetic field structure is substantially in the center of its oscillating motion.

HARRY B. MARVIN.